United States Patent
Kozakura

(10) Patent No.: US 11,703,671 B2
(45) Date of Patent: Jul. 18, 2023

(54) LIGHT SOURCE UNIT AND FIBER LIGHT SOURCE APPARATUS INCLUDING THE LIGHT SOURCE UNIT

(71) Applicant: Ushio Denki Kabushiki Kaisha, Tokyo (JP)

(72) Inventor: Takayuki Kozakura, Tokyo (JP)

(73) Assignee: Ushio Denki Kabushiki Kaisha, Tokyo (JP)

( * ) Notice: Subject to any disclaimer, the term of this patent is extended or adjusted under 35 U.S.C. 154(b) by 340 days.

(21) Appl. No.: 17/159,607

(22) Filed: Jan. 27, 2021

(65) Prior Publication Data

US 2021/0239957 A1    Aug. 5, 2021

(30) Foreign Application Priority Data

Feb. 5, 2020   (JP) .............................. JP2020-017848

(51) Int. Cl.
  G02B 21/08   (2006.01)
  G02B 21/00   (2006.01)
  G01N 21/64   (2006.01)

(52) U.S. Cl.
  CPC ....... *G02B 21/082* (2013.01); *G01N 21/6458* (2013.01); *G02B 21/0032* (2013.01); *G02B 21/0076* (2013.01)

(58) Field of Classification Search
  CPC .............. G02B 21/082; G02B 21/0032; G02B 21/0076; G02B 21/00; G02B 21/0004; G02B 21/002; G02B 21/06; G02B 21/16; G02B 6/00; G02B 6/0001; G02B 6/42; G02B 6/4204; G02B 6/4214; G02B 6/4215; G02B 19/0047; G02B 19/0052; G02B 19/0061; G01N 21/6458; G01N 2021/6463; G01N 2021/6471; G01N 2021/6484

USPC ....... 359/385, 362, 363, 368, 369, 388, 389, 359/390; 362/551, 553, 555, 583, 558, 362/581, 582, 84

See application file for complete search history.

(56) References Cited

U.S. PATENT DOCUMENTS 10,208,900 B2   2/2019   Kaisha
10,209,503 B2   2/2019   Kaisha
(Continued)

FOREIGN PATENT DOCUMENTS

JP    2016-58213 A      4/2016
JP    2018-40914 A      3/2018
WO    WO-2021149408 A1 *  7/2021

*Primary Examiner* — Arnel C Lavarias
(74) *Attorney, Agent, or Firm* — Kenichiro Yoshida

(57) ABSTRACT

A light source unit includes: a housing; a semiconductor laser that is disposed in the housing and that radiates excitation light; a first condenser optical system that condenses the excitation light; a dichroic mirror that selectively reflects the excitation light; a second condenser optical system that condenses the excitation light; a wavelength conversion member that performs wavelength conversion of the excitation light and emits wavelength-converted light; an emission section that outputs the wavelength-converted light transmitted through the second condenser optical system and the dichroic mirror; and a light blocking section that is disposed between an inner surface of the housing, the inner surface being in a traveling direction of the excitation light toward a reflection surface of the dichroic mirror, and a back surface, the back surface being an opposite side of the reflection surface, or is disposed on the inner surface of the housing.

7 Claims, 5 Drawing Sheets

(56) References Cited

U.S. PATENT DOCUMENTS

2008/0170207 A1\* 7/2008 Egawa ............... G03B 21/2066
　　　　　　　　　　　　　　　　　　　　353/84
2015/0078409 A1\* 3/2015 Sugihara ............... H01S 5/0604
　　　　　　　　　　　　　　　　　　　　372/22

\* cited by examiner

UP / DOWN
TRAVELING DIRECTION OF EMITTED EXCITATION LIGHT (OPTICAL AXIS)

LIGHT SOURCE UNIT AND FIBER LIGHT SOURCE APPARATUS INCLUDING THE LIGHT SOURCE UNIT

CROSS REFERENCES TO RELATED APPLICATIONS

The present invention contains subject matter related to Japanese Patent Application No. 2020-017848 filed in the Japan Patent Office on Feb. 5, 2020, the entire contents of which are incorporated herein by reference.

BACKGROUND OF THE INVENTION

1. Field of the Invention

The present invention relates to a light source unit and a fiber light source apparatus including the light source unit.

2. Description of the Related Art

For example, as a light source installed in a fluorescence microscope, a discharge lamp such as a short-arc super high-pressure mercury lamp, a metal halide lamp, or a xenon lamp has been used. In recent years, use of a solid-state light emitting element, such as a light emitting diode, as a light source has been proposed in view of energy saving, reduction in apparatus size, extension of the life of a light source, and the like.

However, among three types of solid-state light emitting elements that emit red light, green light, and blue light, no solid-state light emitting element that radiates light in the wavelength range of 500 to 550 nm has high luminance, so it is difficult to obtain a sufficiently high luminance in the field view of a fluorescence microscope.

Under the above circumstances, it has been proposed to use, instead of a solid-state light emitting element that emits light in the wavelength range of 500 to 550 nm, a fluorescent light source that irradiates a phosphor with laser light as excitation light and that radiates fluorescence from the phosphor.

Japanese Laid-open Patent Publication No. 2018-40914 discloses a light source apparatus that includes an excitation light source, such as a semiconductor laser, and a phosphor that emits fluorescence in the wavelength range of 450 to 650 nm by receiving excitation light (for example, light in the wavelength range of 440 to 470 nm) from the excitation light source.

Japanese Laid-open Patent Publication No. 2016-58213 discloses a fluorescent light source apparatus that separates excitation light and wavelength-converted light from each other by using a dichroic mirror and that outputs fluorescence.

In Japanese Laid-open Patent Publication No. 2016-58213, there is a problem in that an inner surface of a housing of a light source unit is irradiated with excitation light that is not reflected but is transmitted through the dichroic mirror or with excitation light that is emitted when the dichroic mirror breaks, and the reflected light is output from an emission section of the light source unit. Here, it is possible to solve this problem by disposing a laser beam damper or a laser beam trap in the housing of the light source unit. In this case, however, a new problem of increase in size of the apparatus arises due to placement of the laser beam damper or the like in the housing.

SUMMARY OF THE INVENTION

An object of the present invention is to provide a compact light source unit that can efficiently suppress excitation light from becoming output from the inside of a housing of the light source unit, that ensures a high level of safety, and that is not increased in size due to placement of a laser beam damper or the like therein.

Another object of the present invention is to provide a fiber light source apparatus including the light source unit.

According to an aspect of the present invention, a light source unit includes: a housing; a semiconductor laser that is disposed in the housing and that radiates excitation light; a first condenser optical system that condenses excitation light radiated from the semiconductor laser; a dichroic mirror that selectively reflects excitation light transmitted through the first condenser optical system; a second condenser optical system that condenses excitation light reflected by the dichroic mirror; a wavelength conversion member that performs wavelength conversion of excitation light transmitted through the second condenser optical system and that emits wavelength-converted light; an emission section that outputs, to the outside of the housing, the wavelength-converted light emitted from the wavelength conversion member and transmitted through the second condenser optical system and the dichroic mirror; and a light blocking section that is disposed between an inner surface of the housing, the inner surface being in a traveling direction of the excitation light toward a reflection surface of the dichroic mirror, and a back surface, the back surface being an opposite side of the reflection surface, or is disposed on the inner surface of the housing.

The light blocking section may include a light incident surface that is irradiated with the excitation light, and a light blocking component that prevents the excitation light directly reflected by the light incident surface from becoming incident on the emission section.

When the light blocking section is disposed on the inner surface of the housing, the light incident surface may be the inner surface of the housing.

When the light blocking section is disposed between the inner surface of the housing and the dichroic mirror, the light blocking section may extend from at least a bottom face of the housing or at least a top face of the housing.

The light blocking component may include a first wall-shaped portion protruding from the inner surface of the housing, and the first wall-shaped portion may be disposed between the light incident surface and the emission section. The first wall-shaped portion prevents the excitation light reflected by the light incident surface from directly becoming incident on the emission section.

The light source unit satisfies $$W/Z < X/Y \qquad (1),$$

where W is a width of the light incident surface irradiated with the excitation light, Z is a protruding length of the first wall-shaped portion from the light incident surface, X is a length from a protruding end of the first wall-shaped portion to an entry surface of the emission section, and Y is a length from the protruding end of the first wall-shaped portion to a distal end (distal with respect to the light incident surface) of the emission section.

The first wall-shaped portion may stand on the inner surface of the housing at a right angle ($\theta=90°$) with respect to the light incident surface.

The first wall-shaped portion may stand on the inner surface of the housing at an acute angle ($\theta<90°$) with respect to the light incident surface.

The light blocking component may include a second wall-shaped portion that protrudes from the inner surface of the housing, and the second wall-shaped portion may be disposed between the light incident surface and the second condenser optical system or the wavelength conversion member. The second wall-shaped portion prevents the excitation light reflected by the light incident surface from directly becoming incident on the emission section.

The second wall-shaped portion may stand on the inner surface of the housing at a right angle (θ=90°) with respect to the light incident surface.

The second wall-shaped portion may stand on the inner surface of the housing at an acute angle (θ<90°) with respect to the light incident surface.

The second wall-shaped portion may include an attachment structure to which one end of the dichroic mirror is attached.

The light incident surface may be a diffuse reflection surface. The surface roughness of the diffuse reflection surface may be Ra 0.1 or greater and Ra 75 or less. The diffuse reflection surface may function as a light attenuator described below. The housing may be made of a casting, and the light incident surface may be a casting surface. The surface roughness of the casting surface may be Ra 30 or greater and Ra 65 or less. Here, Ra is arithmetical mean roughness.

A normal line of the light incident surface may be inclined toward the top side or the bottom side of the housing or toward the first wall-shaped portion or the second wall-shaped portion with respect to a traveling-direction axis (optical axis) of the excitation light. Because excitation light reflected by the light incident surface is directed toward the top side or the bottom side of the housing or toward the first wall-shaped portion or the second wall-shaped portion, the number of times the excitation light is reflected in the housing is increased, and the light intensity can be reduced.

The angle (the inclination angle α in FIG. 4) between the normal line of the light incident surface and the optical axis of excitation light is, for example, 0.1° or greater and 3° or less. When the housing is manufactured by casting, the inclination angle (α) may correspond to the draft of die casting. It is possible to adjust the surface roughness of a light incident portion of the side face of the housing by adjusting the surface roughness of the die casting.

The light blocking section may include a light attenuator that reduces the intensity of the excitation light.

The light blocking section may include a light incident surface that is irradiated with the excitation light, and may include a light attenuator that is disposed on the light incident surface and that reduces the intensity of the excitation light.

The light attenuator may be a light absorber or a diffuser (also called a scatterer) disposed on the light incident surface.

The light absorber may be, for example, a light absorbing coating (layer), a black-painted light absorber, a non-reflective coating, or an anti-reflection film, which is disposed on the light incident surface.

The optical axis of excitation light and the optical axis of wavelength-converted light may be perpendicular to each other.

The housing of the light source unit may be made of, for example, a metal such as aluminum or an aluminum alloy.

According to another aspect of the present invention, a fiber light source apparatus includes a light guide member that has one end surface on which light emitted from the light source unit is incident and the other end surface from which the light is emitted.

The fiber light source apparatus may include a condenser optical system that condenses light emitted from the light source unit.

The light source unit may include a condenser optical system that condenses, in front of or behind the emission section, light that is to be incident on the light guide member.

The light blocking section can reduce the light intensity of excitation light transmitted through the dichroic mirror and the light intensity of excitation light when the dichroic mirror does not function due to breakage or the like. Thus, it is possible to prevent high-intensity excitation light from directly becoming incident on the emission section.

It is possible to reduce the size of the light source unit, because the light blocking section can be disposed on the inner surface or in a limited space of the housing of the light source unit and because a laser beam damper or the like is not disposed.

By using the light incident surface as a diffuse reflection surface, it is possible to cause diffuse reflection of excitation light, and it is possible to prevent high-intensity reflected light from the light incident surface from directly becoming incident on the emission section.

By inclining the light incident surface such that the normal line of the light-incident surface is inclined with respect to the optical axis of excitation light, it is possible to prevent high-intensity reflected light from the light incident surface from directly becoming incident on the emission section.

DESCRIPTION OF THE PREFERRED EMBODIMENTS

Hereafter, some embodiments of the present invention will be described. The following embodiments are each used to describe an example of the present invention. The present invention is not limited to the following embodiments, and includes various modifications carried out within the sprit and scope of the present invention. Note that some of the configurations described below are not necessarily essential for the present invention.

First Embodiment

Figure 1:
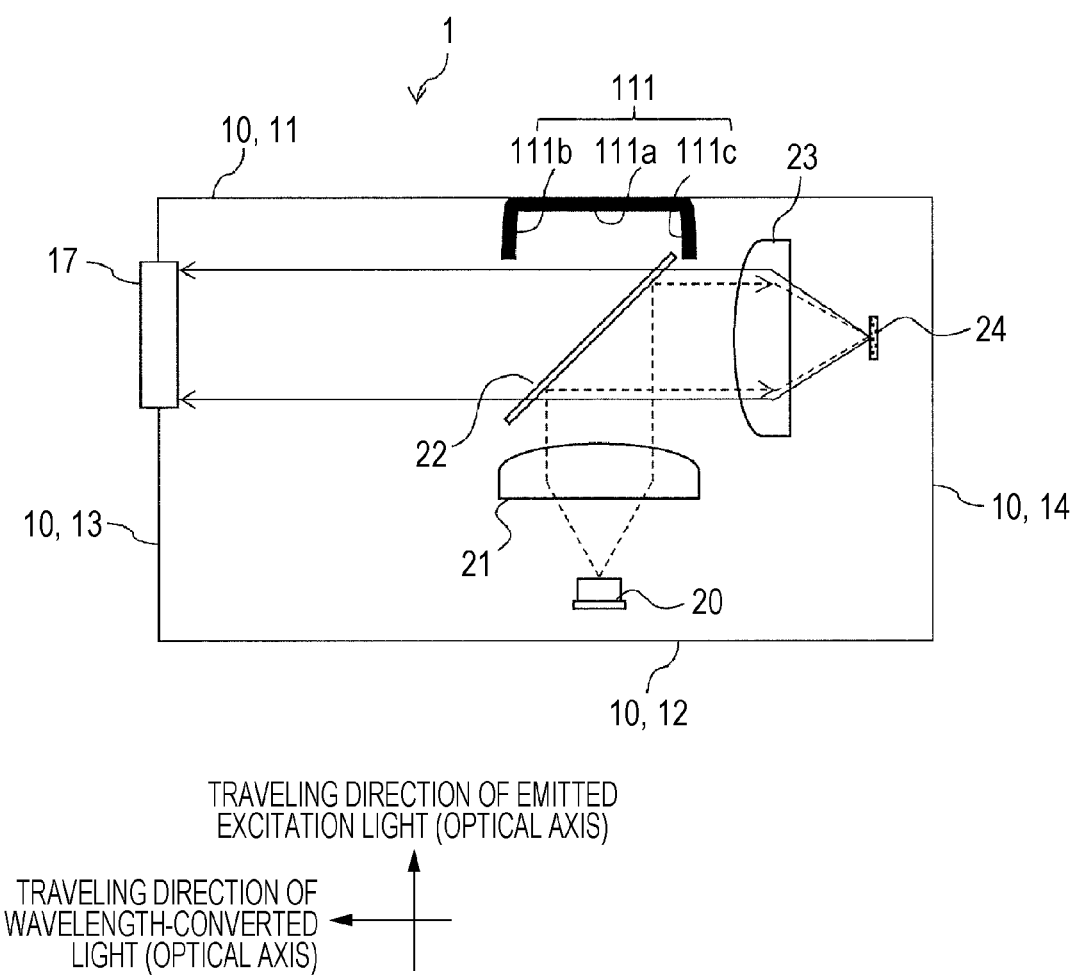
FIG. 1 is a schematic view of an example of a light source unit according to a first embodiment.

Referring to FIG. 1, a light source unit 1 according to a first embodiment will be described.

The light source unit 1 includes: a housing 10; a semiconductor laser 20 that is disposed in the housing 10 and that radiates excitation light; a first collimator lens 21 that condenses excitation light radiated from the semiconductor laser 20; a dichroic mirror 22 that selectively reflects excitation light transmitted through the first collimator lens 21; a second collimator lens 23 that condenses excitation light reflected by the dichroic mirror 22; a phosphor 24 that performs wavelength conversion of excitation light transmitted through the second collimator lens 23 and that emits wavelength-converted light; and an emission section 17 that outputs, to the outside of the housing 10, the wavelength-converted light emitted from the phosphor 24 and transmitted through the second collimator lens 23 and the dichroic mirror 22.

Figure 4:
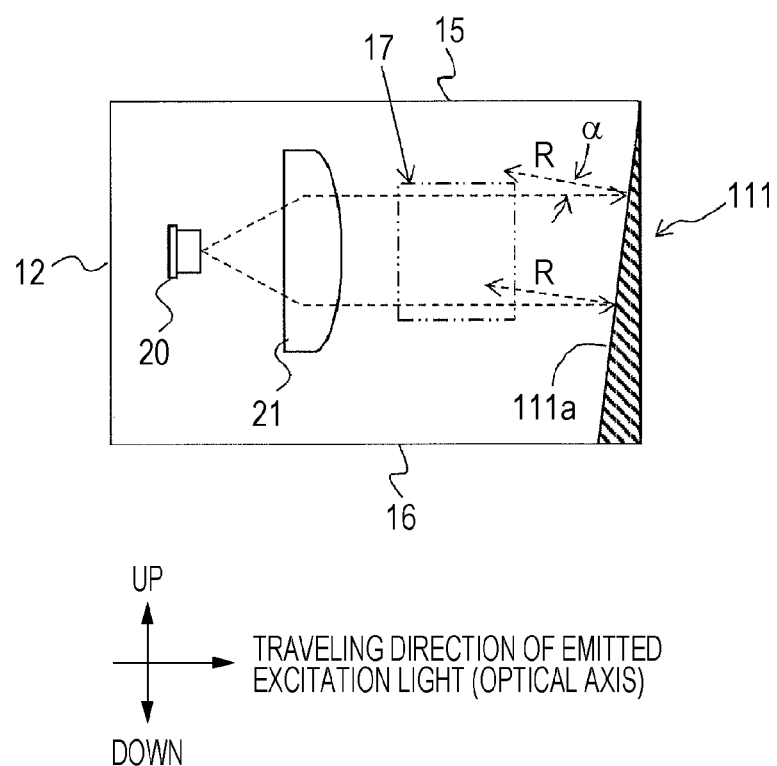
FIG. 4 is a schematic view of a light source unit according to a third embodiment.

In the plan view of FIG. 1, the housing 10 has a rectangular-parallelepiped shape having a first side face 11, a second side face 12 facing the first side face 11, a third side face 13 in which the emission section 17 is disposed, a fourth side face 14 facing the third side face 13, a top face 15 (see FIG. 4), and a bottom face 16 (see FIG. 4). However, the shape of the housing 10 is not particularly limited to this shape.

In the present embodiment, the housing 10 is made of a metal such as an aluminum alloy. The optical axis of excitation light and the optical axis of wavelength-converted light are perpendicular to each other.

The light source unit 1 includes a light blocking section 111 on an inner surface of the first side face 11, the inner surface being in the traveling direction (optical axis), toward a reflection surface of the dichroic mirror 22, of excitation light emitted from the semiconductor laser 20. The light blocking section 111 includes a light incident surface 111a irradiated with excitation light, and a light blocking component that prevents excitation light directly reflected by the light incident surface 111a from becoming incident on the emission section 17. In the present embodiment, the light blocking component includes a first wall-shaped portion 111b protruding from the inner surface of the first side face 11. The first wall-shaped portion 111b is disposed between the light incident surface 111a and the emission section 17. The light incident surface 111a may be the inner surface of the first side face 11 or may be another member.

Figure 2:
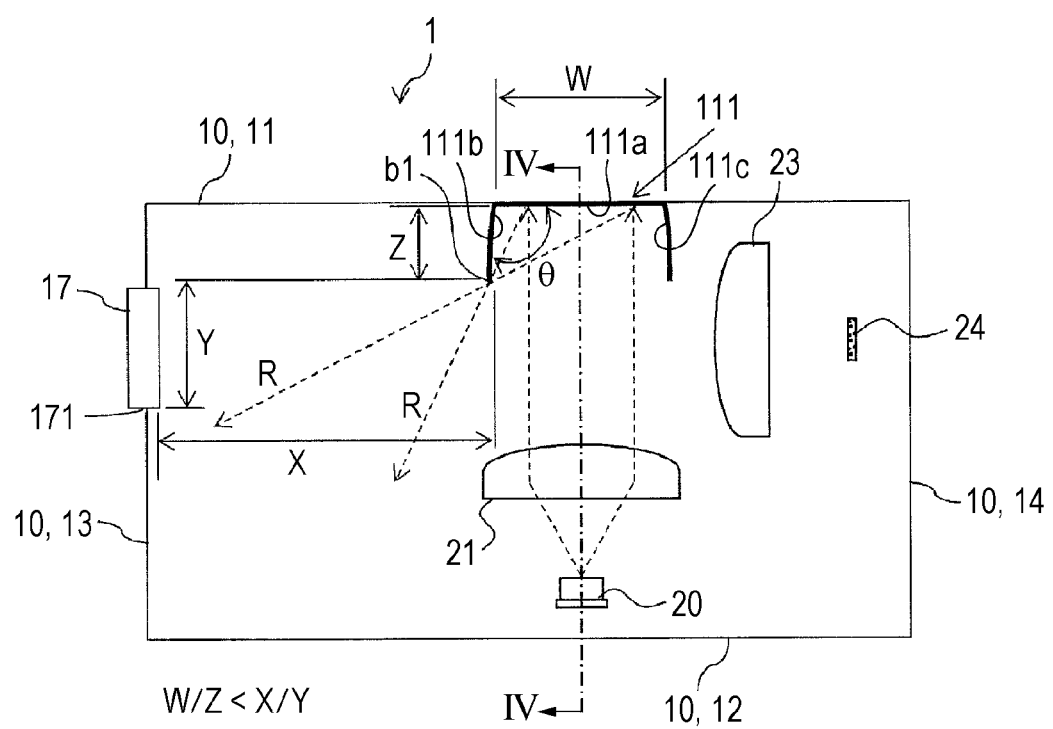
FIG. 2 is a schematic view illustrating a light blocking component of the light source unit of FIG. 1.

Referring to FIG. 2, the positional relationship among the first wall-shaped portion 111b, the light incident surface 111a, and the emission section 17 will be described.

The light source unit 1 satisfies $$W/Z < X/Y \quad (1),$$

where W is the width of the light incident surface 111a irradiated with excitation light, Z is the protruding length of the first wall-shaped portion 111b from the light incident surface 111a in the vertical direction, X is the length in the horizontal direction from a protruding end b1 of the first wall-shaped portion 111b to an entry surface of the emission section, and Y is the length in the vertical direction from the protruding end b1 of the first wall-shaped portion 111b to a distal end 171 (distal with respect to the light incident surface 111a) of the emission section 17.

In the present embodiment, the first wall-shaped portion 111b stands on the inner surface of the first side face 11 to be substantially perpendicular ($\theta=90°$) to the light incident surface 111a. It is illustrated in FIG. 2 that the first wall-shaped portion 111b prevents excitation light R, which is reflected by the light incident surface 111a, from directly becoming incident on the emission section 17.

As illustrated in FIG. 2, the light blocking component includes a second wall-shaped portion 111c that is disposed to face the first wall-shaped portion 111b and that protrudes from the inner surface of the first side face 11. The second wall-shaped portion 111c is disposed between the light incident surface 111a and the second collimator lens 23. The second wall-shaped portion 111c stands on the inner surface to be substantially perpendicular ($\theta=90°$) to the light incident surface 111a.

With the first embodiment, because at least the first wall-shaped portion 111b is present, the excitation light R reflected by the light incident surface 111a does not directly become incident on the emission section 17. Even if the excitation light R becomes incident on the emission section 17, the excitation light R becomes incident on the emission section 17 after being repeatedly reflected in the housing 10 and attenuated. Therefore, it is possible to provide a light source unit that can ensure a high level of safety while fulfilling requirements for compactness.

Second Embodiment

In a light source unit according to a second embodiment, the configuration of a light blocking component differs from that in the first embodiment. Descriptions of elements having the same numerals as those of the first embodiment, which have the same functions as those of the first embodiment, will be omitted or simplified.

Figure 3:
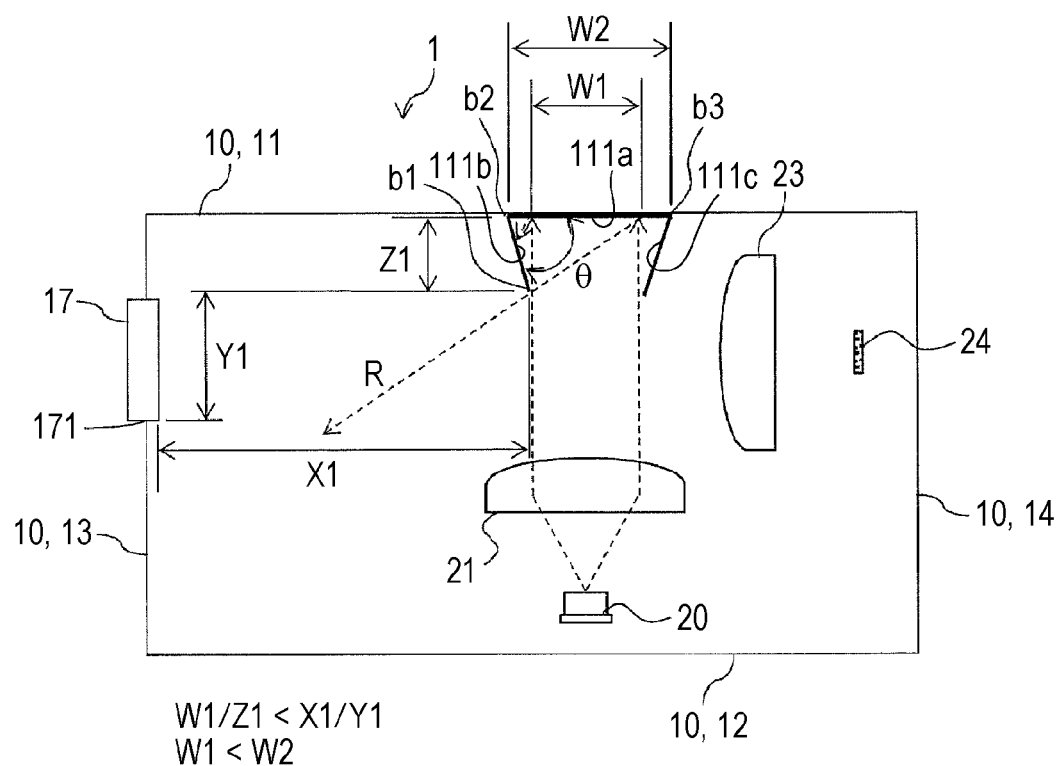
FIG. 3 is a schematic view of a light source unit according to a second embodiment.

In FIG. 3, the first wall-shaped portion 111b and the second wall-shaped portion 111c of a light blocking component each stand on the inner surface at an acute angle ($\theta<90°$) with respect to the light incident surface 111a.

The positional relationship among the first wall-shaped portion 111b, the light incident surface 111a, and the emission section 17 will be described.

The light source unit satisfies $$W1/Z1 < X1/Y1 \quad (2),$$

where W1 is the width of the light incident surface 111a irradiated with excitation light, Z1 is the length of the first wall-shaped portion 111b from the light incident surface 111a in the vertical direction, X1 is the length from the protruding end b1 of the first wall-shaped portion 111b to an entry surface of the emission section, and Y1 is the length from the protruding end b1 of the first wall-shaped portion 111b to the distal end 171 (distal with respect to the light incident surface 111a) of the emission section 17.

Note that a relationship W1>W2 holds, where W2 is the length from a standing point b2 at which the first wall-shaped portion 111b stands on the inner surface to a standing point b3 at which the second wall-shaped portion 111c stands on the inner surface.

With the second embodiment, it is possible to attenuate excitation light further than that with the first embodiment, because the excitation light is further repeatedly reflected in the housing 10 or at the first and second wall-shaped portions 111b and 111c and the light incident surface 111a.

Third Embodiment

In a light source unit according to a third embodiment, the configuration of a light incident surface differs from that in the first embodiment. Descriptions of elements having the same numerals as those of the first embodiment, which have the same functions as those of the first embodiment, will be omitted or simplified.

FIG. 4 is a sectional view taken along line IV-IV of FIG. 2. A normal line of the light incident surface 111a is inclined toward the top face 15 of the housing 10 (upward) with respect to the traveling-direction axis (optical axis) of excitation light. The inclination angle α between the normal line of the light incident surface 111a and the optical axis of excitation light is, for example, 0.1° or greater and 3° or less. The inclination angle α may correspond to the draft of die casting when the housing 10 is manufactured by casting, or the first side face 11 or the light incident surface 111a may be formed to incline by post processing. Note that the draft corresponds to an angle formed between the tangential direction of the light incident surface and a line perpendicular to the bottom face 16 of the housing.

As another embodiment, the normal line of the light incident surface 111a may be inclined toward the bottom face 16 of the housing, the first wall-shaped portion 111b, or the second wall-shaped portion 111c, with respect to the traveling-direction axis (optical axis) of excitation light.

With the third embodiment, compared with a case where the normal line of the light incident surface 111a is parallel to the traveling-direction axis (optical axis) of excitation light, reflected excitation light R is directed further toward the top face 15 (upward). Therefore, the reflected excitation light R is additionally reflected toward the top face 15 of the housing 10 and toward the bottom face 16, and the attenuation effect due to reflection in the housing 10 can be improved.

The configuration of the inclined light incident surface 111a of the third embodiment may be used in combination with, instead of the first embodiment, the first and second wall-shaped portions 111b and 111c of the second embodiment.

Fourth Embodiment

In the first to third embodiments, the light incident surface 111a may be a diffuse reflection surface. The surface roughness of the diffuse reflection surface may be Ra 0.1 or greater and Ra 75 or less. The housing 10 may be made of a casting, the light incident surface 111a may be a casting surface, and the surface roughness of the casting surface may be Ra 30 or greater and Ra 65 or less.

Fifth Embodiment

In the first to third embodiments, a light attenuator that reduces the intensity of excitation light may be disposed on the light incident surface 111a.

The light attenuator may be a light absorber or a diffuser (also called a scatterer) disposed on the light incident surface 111a.

The light absorber may be, for example, a light absorbing coating (layer), a black-painted light absorber, a non-reflective coating, or an anti-reflection film, which is disposed on the light incident surface 111a.

Sixth Embodiment

In the first to third embodiments, the light blocking section 111 need not be disposed on the inner surface of the first side face 11. The light blocking section 111 may extend from the top face 15 or the bottom face 16. The light blocking section 111 may be disposed between the inner surface of the first side face 11, the inner surface being in the traveling direction of excitation light toward the reflection surface of the dichroic mirror 22, and a back surface, the back surface being the opposite side of the reflection surface.

Seventh Embodiment

The light blocking section may include light attenuator that reduces the intensity of excitation light; and the light attenuator may be disposed between the inner surface of the first side face 11, the inner surface being in the traveling direction of excitation light toward the reflection surface of the dichroic mirror 22, and the back surface, the back surface being the opposite side of the reflection surface. The light attenuator may be a light absorber or a diffuser (also called a scatterer). The light absorber may be, for example, a light absorbing coating (layer) formed on a supporter, a black-painted light absorber, a non-reflective coating formed on a supporter, or an anti-reflection film formed on a supporter. The supporter need not be disposed on the inner surface of the first side face 11, and may extend from the top face 15 or the bottom face 16.

Fiber Light Source Apparatus

Figure 5:
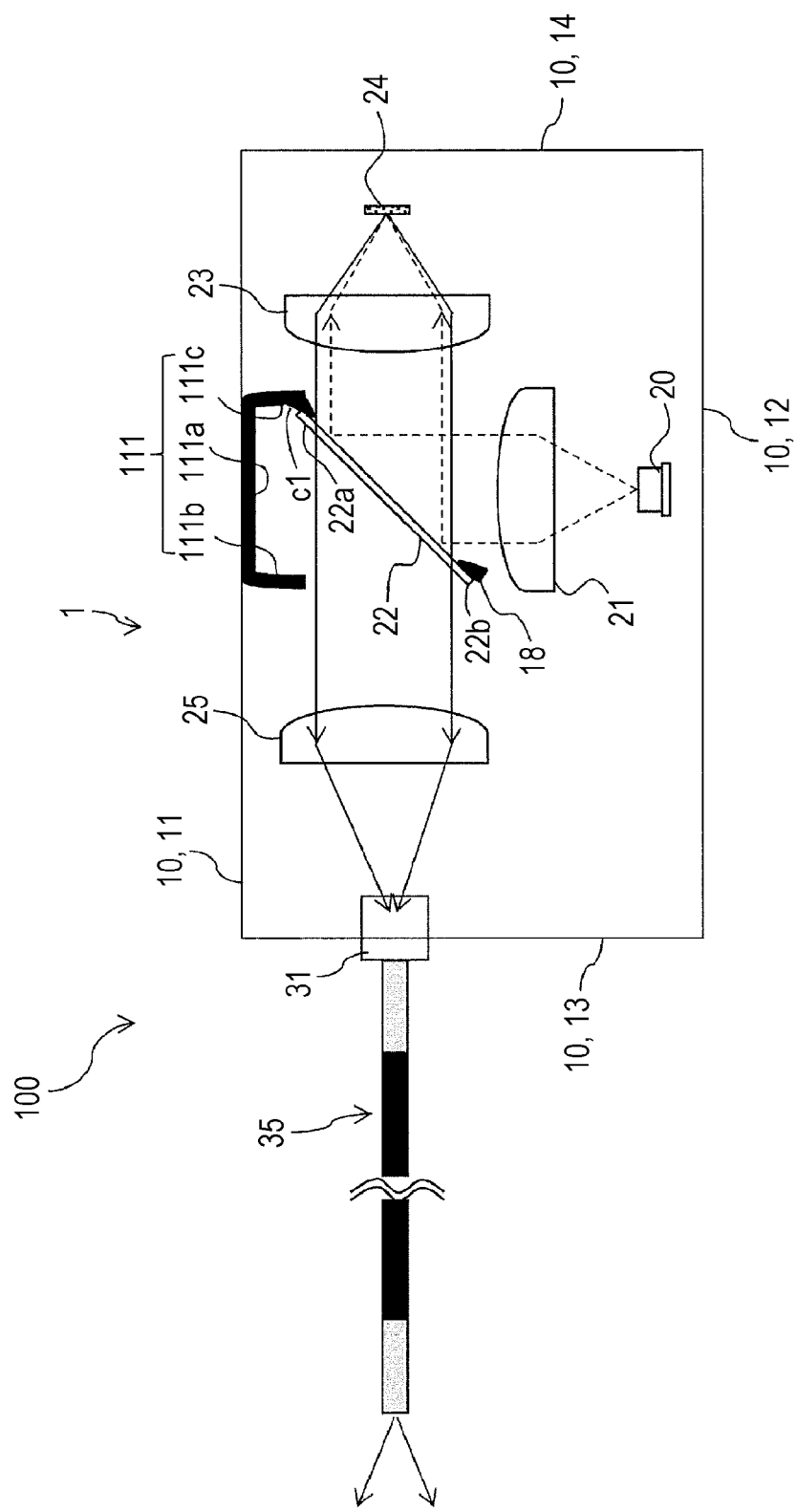
FIG. 5 is a schematic view of an example of a fiber light source apparatus including the light source unit according to each embodiment.

FIG. 5 is a schematic view of a fiber light source apparatus 100. Description of elements in FIG. 5 having the same numerals as those of the first to third embodiments, which have the same functions as those of the first to third embodiments, will be omitted.

The fiber light source apparatus 100 includes a light source unit 1 and a light guide member 35 that has one end surface on which light emitted from the light source unit 1 is incident and the other end surface from which the light is emitted. The light source unit 1 may be a light source unit according to any of the embodiments described above.

The light source unit 1 includes a condenser lens 25 that condenses wavelength-converted light from the phosphor 24, which is transmitted through the second collimator lens 23 and the dichroic mirror 22, and a connector 31 that guides the light condensed by the condenser lens 25 toward the light guide member 35.

In the present embodiment, a tip part c1 of the second wall-shaped portion 111c is inclined toward the light incident surface 111a, and the tip part c1 has an attachment structure that fixes one end portion 22a of the dichroic mirror 22. The other end portion 22b of the dichroic mirror 22 is fixed to an attachment structure of a column portion 18 that stands on the bottom face. Each of the attachment structures is not particularly limited, may be screw members such as a bolt and a nut, or may be a clamping member such as a plate spring.

Other Embodiments

The first to seventh embodiments may include other members.

The light attenuator may be disposed on the inner surface of each side face, the top face, or the bottom face of the housing.

What is claimed is:
1. A light source unit comprising:
a housing;
a semiconductor laser that is disposed in the housing and that radiates excitation light;
a first condenser optical system that condenses the excitation light radiated from the semiconductor laser;
a dichroic mirror that selectively reflects the excitation light transmitted through the first condenser optical system;
a second condenser optical system that condenses the excitation light reflected by the dichroic mirror;
a wavelength conversion member that performs wavelength conversion of the excitation light transmitted through the second condenser optical system and that emits wavelength-converted light;
an emission section that outputs, to an outside of the housing, the wavelength-converted light emitted from the wavelength conversion member and transmitted through the second condenser optical system and the dichroic mirror; and a light blocking section that is disposed between an inner surface of the housing, the inner surface being in a traveling direction of the excitation light toward a reflection surface of the dichroic mirror, and a back surface, the back surface being an opposite side of the reflection surface, or is disposed on the inner surface of the housing.

2. The light source unit according to claim 1,
wherein the light blocking section includes
   a light incident surface that is irradiated with the excitation light, and
   a light blocking component that prevents the excitation light directly reflected by the light incident surface from becoming incident on the emission section.

3. The light source unit according to claim 2,
wherein the light blocking component includes a first wall-shaped portion protruding from the inner surface of the housing, and
wherein the first wall-shaped portion is disposed between the light incident surface and the emission section.

4. The light source unit according to claim 3, wherein the light source unit satisfies $$W/Z < X/Y \tag{1},$$

where W is a width of the light incident surface, Z is a protruding length of the first wall-shaped portion from the light incident surface, X is a length from a protruding end of the first wall-shaped portion to an entry surface of the emission section, and Y is a length from the protruding end of the first wall-shaped portion to a distal end of the emission section.

5. The light source unit according to claim 1,
wherein the light blocking section includes
   a light incident surface that is irradiated with the excitation light, and
   a light blocking component that prevents the excitation light directly reflected by the light incident surface from becoming incident on the emission section, and
wherein a normal line of the light incident surface is inclined with respect to a traveling-direction axis of the excitation light.

6. The light source unit according to claim 1,
wherein the light blocking section includes
   a light incident surface that is irradiated with the excitation light, and
   a light attenuator that is disposed on the light incident surface and that reduces an intensity of the excitation light.

7. A fiber light source apparatus comprising a light guide member that has two end surfaces, one of the end surfaces on which light emitted from the light source unit according to claim 1 is incident and the other one of the end surfaces from which the light is emitted.

\* \* \* \* \*